Feb. 13, 1962 P. MALLERY 3,021,070

BINARY ADDERS

Filed Oct. 2, 1958

INVENTOR
P. MALLERY
BY Kenneth B Hamlin
ATTORNEY 3,021,070

BINARY ADDERS

Paul Mallery, Murray Hill, N.J., assignor to Bell Telephone Laboratories, Incorporated, New York, N.Y., a corporation of New York Filed Oct. 2, 1958, Ser. No. 764,986
12 Claims. (Cl. 235—176)

Figure 1:
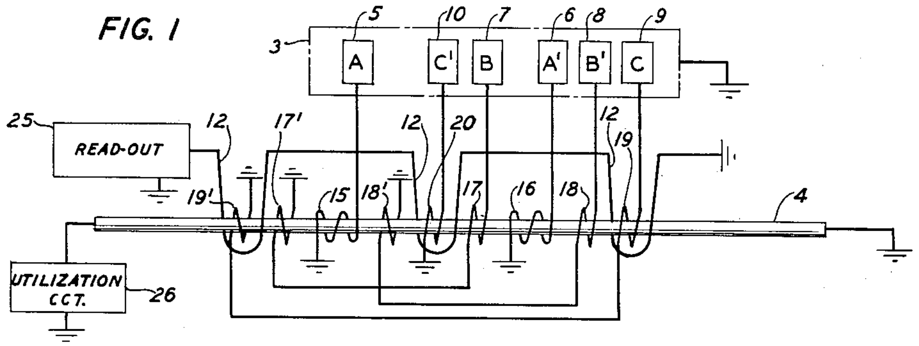

This invention relates to binary adders and more particularly to adders employing magnetic principles.

In the process of binary addition utilized in modern computing machinery, devices are employed for producing the sum of two digits in corresponding orders of binary numbers with provision for including the carry from the next lower order. The Boolean expression for such an adding device which accepts signals, each of which may represent a "1" or a "0," from three different sources and adds them to yield a value equal to the sum, is $$f(\text{sum}) = AB'C' + A'BC' + A'B'C + ABC$$

while the Boolean expression for the device which accepts these same signals from these sources and which device produces an output when the sum of two digits of the same order equals or exceeds the base of the number system in use is $$f(\text{carry out}) = AB + AC + BC$$

Since the binary full adder has had many applications in digital computers there have, accordingly, been a number of methods heretofore proposed for satisfying the function performed thereby. Numerous satisfactory devices, such as those employing coincident current magnetic cores or dual control electron tubes, are known in the art which satisfy the second of the above two Boolean expressions. However, in implementing the first of the above-mentioned Boolean expressions the number and complexity of circuit elements required has made it desirable to seek simpler and more compact structures than have heretofore been proposed.

Accordingly, it is an object of the present invention to effect an improvement in binary full adders.

It is another object of the present invention to provide a simplified and compact binary sum generator.

It is still another object of the present invention to provide a binary sum generator capable of utilizing either simultaneously or sequentially available addend and augend signals together with a subsequently available carry-in signal.

The present invention advantageously makes use of the basic "Twistor" structure described by A. H. Bobeck in the copending application, Serial No. 675,522, filed August 1, 1957, and discussed in the November 1957 issue of the Bell System Technical Journal together with the principles of switched region propagation disclosed in the copending application of A. H. Bobeck, Serial No. 752,905, filed August 4, 1958.

In the above-referenced article, the "Twistor" is defined as a magnetic element within which a preferred helical flux path is established and into which magnetic element information may be inserted in the form of a polarized helical magnetization. The information is sensed using the magnetic element as a sensing means by detecting the polarity of the voltage produced across the ends of the magnetic element as its magnetization state is changed.

In the above second-mentioned, copending application of A. H. Bobeck, the interaction effects which exist between magnetized regions on a magnetic wire, such as the wire employed in the "Twistor," are utilized to "slide" a magnetized region along the magnetic wire under the control of externally applied magnetizing forces established by a plurality of phase windings. The principles upon which the operation of this device is believed to be formulated is that there is associated with a stable magnetic spot a minimal critical length below which the spot is unstable. Stated another way, the magnetic material exhibits a substantially square loop or two-state hysteresis characteristic when excited over at least a minimal conductor dimension. A stable magnetized region, i.e., one within which a stable hysteretic state has been established is therein operated upon by phase windings, each of which is less than the critical length, such that the forward energization of a phase winding at the head end of a magnetic spot and the reverse energization at the tail end of a magnetic spot will cause the magnetic spot to appear to move in a definite direction along the magnetic wire.

Briefly, I have discovered that the ability to extend a switched region on a twistor as is demonstrated in the above-noted copending application, Serial No. 752,905, may be exploited to provide a sum generator possessing distinctive advantages.

In accordance with the principles of this invention, addend, augend and carry-in signal sources are respectively coupled to corresponding signal windings on a magnetic conductor to produce a "1" magnetic state at one of a plurality of readout positions thereon whenever a "1" signal is applied to either one or to three of the signal windings and to maintain a "0" magnetic state at the readout positions whenever a "1" signal is applied to two of the signal windings. In one specific illustrative embodiment, a pair of addend windings establishes a "1" magnetic state at either of two points along the conductor and pairs of subminimal-length augend and carry-in windings are arranged in juxtaposition therewith for either advancing the "1" magnetic state to one of three readout positions flanking the pair of addend windings or for terminating the "1" magnetic state short of the readout positions in accordance with the values of the respective addend, augend and carry-in signals. In another illustrative embodiment a "1" magnetic state established at three points along the conductor may either be extended to one of three readout positions by energizing no more than one subminimal-length addend, augend or carry-in windings, or may be inhibited from the readout positions by energizing any two subminimal-length, addend, augend or carry-in windings. A "1" magnetic state may be produced at a fourth readout position by energizing all three such windings.

It is an aspect of one specific embodiment of this invention that there is provided a binary sum generator which may utilize either simultaneously or sequentially occurring addend and augend signals together with a subsequently occurring carry-in signal.

It is a feature of this invention that addend, augend and carry-in signals define alternative paths in a magnetic conductor along which a magnetic spot may be extended to a readout position when either one or three of the signals have the value "1" and which magnetic spot may be terminated short of the readout position when just two of the signals have the value "1."

It is a feature of one specific embodiment of this invention that an addend signal coupled to a magnetic conductor establish therein a stable magnetic spot which may be subsequently advanced towards a readout position by either of a pair of augend signals and which spot may thereafter be further advanced to reach a readout position only by a pre-determined one of a pair of carry-in signals.

It is another feature of a specific embodiment of this invention that a magnetic conductor have a plurality of windings to which addend, augend and carry-in signals of either "1" or "0" value are applied, either value addend signal establishing a stable magnetic spot in a respective location of the conductor and each value augend and carry-in signal applying to one of the locations an extending M.M.F. in an opposite sense to that of the other value augend and carry-in signal.

It is a feature of another specific embodiment of this invention that addend, augend and carry-in signals define in a magnetic conductor distinctive paths for the extension of magnetic spots when any one of the signals is coupled thereto, cumulative paths for the extension of a magnetic spot when all three of the signals are coupled thereto and mutually exclusive paths when any two of the signals are coupled thereto.

Figure 2:
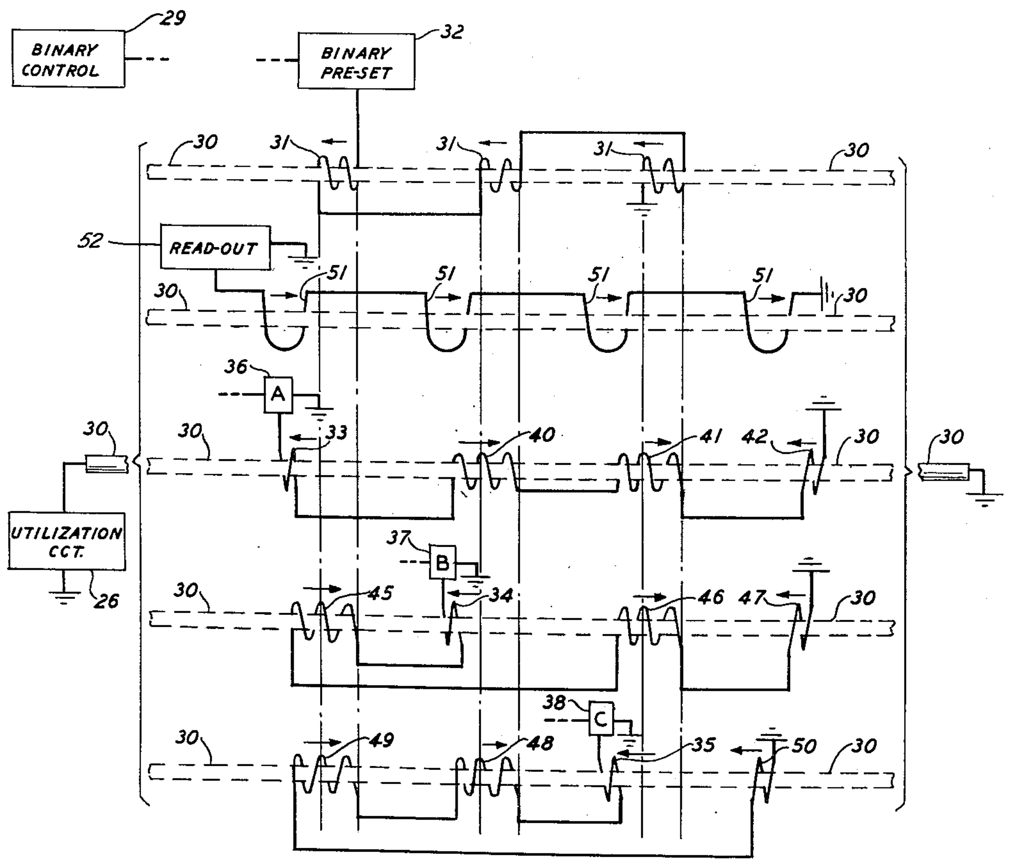

The foregoing and other objects and features of the present invention may be more readily understood from the following description of illustrative embodiments thereof, when read with reference to the accompanying drawing, in which:

FIG. 1 shows in schematic form an illustrative embodiment of a binary sum generator in accordance with the principles of the invention, and FIG. 2 shows in schematic form an alternative form of binary sum generator.

Referring now to FIG. 1, there is shown a binary sum generator comprising an input logic system 3 including a plurality of binary signal sources 5 to 10, a magnetic conductor 4 advantageously having established therein a preferred helical flux path such as is described in the above-noted copending application, Serial No. 675,522, a pair of windings 15 and 16 of at least the above-mentioned minimum length and a plurality of subminimal-length windings 17 to 20 and 17′ to 19′ coupled to the conductor 4 and connected to the logic system 3. Three readout windings 12, each of at least minimal length, are inductively coupled to conductor 4 defining therein three predetermined positions for the detection of the particular conditions of magnetization to be produced in conductor 4 by the different sequential operations of the binary signal sources comprising input logic system 3. Connected to binary signal sources 5 to 10 are windings 15 to 20, respectively, of which windings 17, 18 and 19 are connected in series with windings 17′, 18′ and 19′. Readout windings 12 are coupled to conductor 4 in opposite sense to each of windings 15 to 20 and 17′ to 19′.

In operation, the device of FIG. 1 performs the logic function defined by the Boolean expression, $$f(\text{sum})=AB'C'+A'BC'+A'B'C+ABC$$

in the following manner: conductor 4 is assumed to be set throughout its length to one of its remanent flux states. Windings 15 and 16 are of at least the above-mentioned minimal length and accordingly are able to switch the remanent state of conductor 4 in the respective regions of conductor 4 to which they are coupled to establish a stable spot of at least the minimal dimension. In accordance with the characteristics of the input logic system 3, either binary signal source 5, representative of the addend digit "1," or binary signal source 6, representative of the addend digit "0," but not both, may be actuated at any given time. Assuming that binary signal source 5 is actuated, winding 15 will be energized and a distinctive stable spot of magnetization representative of the addend digit "1" will be established in conductor 4 in the region thereof associated with winding 15. Further in accordance with the characteristics of input logic system 3, binary signal source 7, representative of the augend digit "1," or binary signal source 8, representative of the augend digit "0," but not both, may then be actuated. In the event that source 7 is actuated, subminimal length windings 17 and 17′ will both be energized but no change in the magnetic state of conductor 4 under winding 17 will be effected because winding 17 is neither adjacent to the stable spot of magnetization priorly produced by winding 15 nor does winding 17 acting alone provide sufficient M.M.F. to establish a stable spot in conductor 4. Subminimal length winding 17′ which is simultaneously energized with winding 17 by input source 7 and which is disposed adjacent to winding 15 will, however, function to extend towards the left the stable spot or "1" set into conductor 4 by the prior energization of winding 15. On the other hand, had input source 8 representative of the augend digit "0" been actuated, the stable spot priorly set by the energization of winding 15 would be extended towards the right by the energization of winding 18′, while energization of winding 18, like the previously discussed energization of winding 17, would neither establish nor extend a stable spot of magnetization in element 4. On the next operation of input logic system 3 either binary signal source 9, representative of the carry-in digit "1," or binary signal source 10, representative of the carry-in digit "0," but not both, will be actuated; the former serving to energize subminimal-length windings 19 and 19′ and the latter subminimal-length winding 20. The energization of winding 20 would serve to extend under the central one of readout windings 12 the spot of magnetization priorly extended by winding 18′ while the energization of winding 19′ would serve to extend under the left-most readout winding 12 the spot of magnetization priorly extended by winding 17′. Accordingly, the successive actuation of input sources 5, 7 and 9, representing the Boolean expression ABC and the arithmetic sum 1+1+1, functions to establish a distinctive magnetic spot in conductor 4 and then to extend that spot under the left-most one of the readout windings 12. Similarly, actuation of input sources 5, 8 and 10; 6, 7 and 10; and 6, 8 and 9, respectively, satisfy the remaining Boolean expressions AB′C′, A′BC′ and A′B′C required in summing logic by extending a spot of magnetization under the center, center, and right-most one of windings 12.

When the information output sequences of logic source 3 is such that any two of the binary "1" signal sources are actuated, satisfaction of the above-mentioned Boolean expression requires that no output signal be obtained when readout windings 12 are energized. In accordance with this requirement, the spot of magnetization established in conductor 4 will be terminated short of the read-out windings 12 when any two of the binary "1" signal sources are actuated. Thus, for example, the information sequence ABC′ which results in the energization of windings 15, 17′, and 20, in the order named, will not extend a magnetic spot under any of read-out windings 12. This is because subminimal-length winding 17′ when constructed in accordance with the methods described herein as well as in the above-mentioned copending application Serial No. 752,905 is sufficiently short so as to be incapable in itself to extend the magnetic spot under the left-most one of read-out windings 12, and also because winding 20 is positioned too remote from winding 17′ to effect spot extension. Thus, in the information sequence ABC′, subminimal-length winding 17′ functions to terminate the magnetic spot in the region of conductor 4 over which it is wound. Similarly, the information sequences AB′C and A′BC result in the termination of a magnetic spot short of any of read-out windings 12.

The spot magnetization extended under any of readout windings 12 in accordance with information sequences AB′C′, A′BC′, A′B′C or ABC may be sensed through the energization of readout windings 12 by actuation of readout pulse source 25 to switch the state of magnetization under the windings 12; thereby to deliver a voltage pulse to the utilization circuit 26 in accordance with known "Twistor" principles. The above-mentioned remanent flux state which was assumed to be established throughout the length of conductor 4 may advantageously be established by source 25 applying a higher amplitude pulse to windings 12 than is required to switch the state of magnetization thereunder, or equally advantageously, a coaxial solenoid winding, not shown in the drawing which extends the length of conductor 4 similarly may be energized.

The above-described binary full adder is advantageously utilized where both the variable and its prime are available. In FIG. 2 there is shown a binary full adder suitable for use with single-rail logic input. In order to more clearly show the winding pattern the single magnetic conductor 30 has been separately shown within the brackets in its association with each of the preset, readout, binary input advance, inhibiting and carry-in windings. The composite picture of the device shown in FIG. 2 may be obtained by superimposing upon one another the five redundant depictions of magnetic conductor 30. Coupled to magnetic conductor 30 at each of three positions thereon are preset windings 31, each of at least minimal length, which when energized by operation of binary preset source 32 establish in each of the respective areas of magnetic conductor 30 to which they are inductively coupled, a stable magnetic spot or "1." Located adjacent and to the left of each of the three windings 31 are subminimal-length binary input windings 33, 34 and subminimal-length carry-in winding 35 which windings are respectively connected to input sources 36, 37 and 38. Input sources 36 to 38 and binary preset 32 are selectively actuable by binary control 29. Each of windings 33 to 35 is capable of extending a respective spot of magnetization set by one of the windings 31 to a corresponding one of the readout windings 51. Windings 33 to 35 are not, however, capable, in the absence of such a set spot, to effect a change in the hysteretic state of conductor 30. Serially connected to binary input winding 33 are inhibit windings 40 and 41, each at least the above-mentioned minimal length, and a further binary input winding 42, of subminimal length. Inhibit windings 40 and 41 are of opposite sense to windings 31 and when energized, windings 40 and 41 will apply an opposing M.M.F. to conductor 30 and thereby terminate or "erase" the spot of magnetization set respectively under the center and right-most one of windings 31. In the event that binary control 29 sequentially actuates input sources 36 to 38, winding 42 (which would be the first actuated thereof) advantageously may be wound to be of at least the above-mentioned minimal length thereby to establish a stable magnetic spot in conductor 30. On the other hand if binary control 29 coincidentally actuates input sources 36 and 37 and subsequently actuates input source 38, winding 42 may equally advantageously be designed to supply approximately half the M.M.F. required to establish a stable magnetic spot in conductor 30 (for which purpose winding 42 may be subminimal length or not, as may be convenient). Winding 42 would then comprise one of a pair of coincident current windings (the other one of the pair being winding 47) which windings when simultaneously energized would be sufficient to establish a stable "1" in the portion of conductor 30 to which they are jointly coupled. Serially connected to binary input winding 34, are inhibit windings 45 and 46, each of at least the above-mentioned minimal length, and winding 47, which for sequential actuation is of subminimal length and which for coincidental actuation may be of any convenient length. Winding 47 is of the same sense as winding 42 and the inhibit windings 45 and 46 are each of opposite sense to windings 31. Windings 45 and 46 when energized will terminate the spot of magnetization set respectively by the left-most and right-most of windings 31. Serially connected to binary input windings 35, are inhibit windings 48 and 49 and advance winding 50, winding 50 being of the same sense as windings 42 and 47 and inhibit windings 48 and 49 each being of opposite sense to that of windings 31. Windings 48 and 49, when energized, will terminate the spot of magnetization set respectively by the center and left-most one of windings 31.

In operation, the device of FIG. 2 functions as follows: assuming the magnetic conductor 30 to be in the "0" hysteretic state, actuation of preset pulse source 32 will energize each of preset windings 31 to establish three stable regions in conductor 30 that are magnetized in the "1" remanent flux state. Actuation of any one of input sources 36, 37 or 38 will extend one of the stable "1" regions set by windings 31 under a corresponding one of readout windings 51. Thereafter, actuation of readout pulse source 52 to energize windings 51 will produce, by switching the "1" magnetic state that has been extended under one of windings 51, a voltage that appears across the ends of conductor 30 and which voltage may be detected by utilization circuit 26. Thus, the Boolean expressions AB'C', A'BC' and A'B'C representing, respectively, 100, 010 and 001 are satisfied. If, however, just two of the input sources 36, 37 and 38 are actuated, corresponding to the Boolean expressions ABC', A'BC and AB'C, all of the stable "1" regions established by windings 31 will be terminated short of the readout means by the mutually opposing M.M.F.'s applied by the inhibiting windings connected in series with each of the two actuated binary input windings and no signal. By terminating the preset "1" magnetic spot in addition to opposing the extending magnetomotive forces of windings 33, 34 and 35 the possibility is eliminated that a stagger in actuation of the input sources would allow an "extend" pulse to function after an "inhibit" pulse had been removed.

The extension under one of readout windings 51 of a stable magnetized region set by one of windings 31 (by the actuation of only one of sources 36, 37 or 38) and the prevention of such extension (by the energization of just two of sources 36, 37 and 38) satisfies the Boolean requirement: $AB'C'+A'BC'+A'B'C$ but does not satisfy the requirement: ABC. For this latter purpose, either of the two variations in the mode of operation, namely, coincidental or sequential actuation of sources 36 and 37 may be advantageously effected in regard to windings 42 and 47 and advance winding 50. Thus, for the coincidental mode of actuation of sources 36 and 37, each of windings 42 and 47 may supply one-half of the magnetomotive force required to establish a stable "1" region in conductor 30 and winding 50 need thereafter supply only the subminimal magnetomotive force required to extend the "1" region under the right-most one of readout windings 51 to satisfy the Boolean relation ABC. Alternatively, winding 42 may be of sufficient length to establish a stable spot and windings 47 and 50 may each be of subminimal length to satisfy the requirement ABC in sequential mode of actuation of sources 36, 37 and 38.

It is to be understood that the above-described arrangements are ilustrative of the application of the principles of the invention. Numerous other arrangements may be devised by those skilled in the art without departing from the scope of the invention.

What is claimed is:

1. In a binary adder, the combination comprising an elongated magnetic conductor exhibiting a substantially two-state magnetization characteristic beyond a minimal dimension, binary signal source means including at least three selectively actuable binary "1" signal sources, readout means coupled to said conductor, means for coupling said source means to said conductor to direct a magnetic spot of at least said minimal dimension to said readout means when one of said binary "1" source is actuated, means for coupling said source means to said conductor selectively to terminate said spot short of said readout means when another of said binary "1" signal sources is actuated, and means for coupling said source means to said conductor to effect a directed spot of at least said minimal dimension at said readout means when all of said binary "1" sources are actuated.

2. In a binary adder, the combination comprised as in claim 1 wherein said means to terminate said spot comprises a winding shorter than said minimal dimension connected to said source means, said winding being coupled to said conductor at least one winding length remote from said readout means.

3. In a binary adder, the combination comprised as in claim 1 wherein said means to terminate said spot comprises an inhibiting winding at least said minimal dimension connected to said source means said inhibiting winding being coupled to said conductor in juxtaposition with said spot.

4. In a binary adder, the combination comprises as in claim 2 wherein said binary signal source means further includes a plurality of selectively actuable binary "0" signal sources, and wherein said means to direct a magnetic spot to said readout means comprises at least one minimal length winding connected to one of said binary "0" sources.

5. In a binary adder the combination comprising an elongated magnetic conductor exhibiting a substantially two-state hysteresis characteristic when excited along at least a minimal conductor length; a source of "1" and a source of "0" addend signals coupled to said conductor for establishing a stable magnetic spot in respective minimal lengths thereof; a source of "1" and a source of "0" augend signals, means for applying said "1" augend signals along first subminimal lengths of said conductor adjacent each of said minimal lengths in one sense, means for applying said "0" augend signals along second subminimal lengths of said conductor adjacent each of said minimal lengths in an opposite sense to said one sense; a source of "1" and a source of "0" carry-in signals, means for applying one of said carry-in signals along third subminimal lengths of said conductor adjacent each of said minimal lengths in opposite senses, means for applying the other of said carry-in signals along a further subminimal length of said conductor immediately between a predetermined one of said first subminimal lengths and a predetermined one of said second subminimal lengths; means for applying a readout signal to said third subminimal lengths and along said further subminimal length; and means coupled across the ends of said conductor responsive to the signal produced thereacross when said readout signal is applied.

6. A binary sum generator comprising a magnetic conductor exhibiting a bi-stable magnetization characteristic beyond a minimal length, a plurality of binary signal sources, means for selectively actuating predetermined ones of said sources to represent a binary "1," means for establishing a spot of stable magnetization in said conductor, readout means coupled to said conductor, means coupled to subminimal lengths of said conductor adjacent said spot and connected to said sources for extending said spot to said readout means when one of said predetermined sources is actuated, means coupled to subminimal lengths of said conductor adjacent said spots and connected to said sources for extending said spot to said readout means when all of said predetermined sources are actuated, and means coupled to said conductor and connected to said binary signal sources for preventing the extension of each said spot to said readout means when any two of said predetermined sources are actuated.

7. A binary sum generator in accordance with claim 6 further including means for selectively actuating other predetermined ones of said sources to represent a binary "0," and wherein said means for establishing said spot of stable magnetization includes a winding of at least said minimal length connected to one of said other predetermined sources and wherein said means for extending said predetermined spots and said means for preventing the extension of said spot further include subminimal length winding means connected to said other predetermined sources and coupled to predetermined points on said conductor.

8. A binary sum generator in accordance with claim 7 wherein said means for extending predetermined spots and said means for preventing the extension of said spot comprise serially-connected subminimal-length winding pairs, said pairs each being connected to a corresponding one of said predetermined and said other predetermined sources, each subminimal-length winding of said winding pairs being coupled to said conductor adjacent one of said spots.

9. A binary sum generator in accordance with claim 6 wherein said means for extending said predetermined spots comprise subminimal-length windings coupled to predetermined points on said conductor.

10. A binary sum generator in accordance with claim 9 wherein at least two of said predetermined sources may be simultaneously actuated and wherein said means for establishing a spot of stable magnetization includes a subminimal-length coincidence winding connected to one of said predetermined sources, each said coincidence winding being positioned within a predetermined length on said conductor.

11. A binary sum generator in accordance with claim 10 wherein said means for preventing said extension comprises a pair of windings of at least said minimal length serially connected to a respective subminimal-length winding.

12. A binary sum generator comprising an elongated magnetic conductor exhibiting a two-state hysteresis characteristic beyond a minimal dimension; means for establishing one said hysteresis state throughout said conductor, binary signal source means including at least three selectively actuable binary "1" signal sources, means coupling said source means to said conductor for establishing the other said hysteresis state in at least one portion of said conductor, a readout winding linking predetermined points on said conductor, means coupling said source means to said conductor to extend said other hysteresis state to one of said points when one of said binary "1" sources is actuated, means coupling said source means to said conductor to extend said other hysteresis state to another of said points when all of said binary "1" sources are actuated, and means for maintaining said one hysteresis state at said predetermined points when two of said binary "1" signal sources are actuated.

References Cited in the file of this patent

UNITED STATES PATENTS

| | | |
|---|---|---|
| 2,696,347 | Lo | Dec. 7, 1954 |
| 2,733,424 | Chen | Jan. 31, 1956 |
| 2,810,901 | Crane | Oct. 22, 1957 |
| 2,819,019 | Yetter | Jan. 7, 1958 |

OTHER REFERENCES

Abbott et al.: Multihole Ferrite Core Configurations and Applications, Proceedings of the IRE, August 1957, pages 1081 to 1093.